F. W. BUSSE.
EAVES TROUGH OR GUTTER COVER.
APPLICATION FILED DEC. 6, 1919.
1,349,264. Patented Aug. 10, 1920.
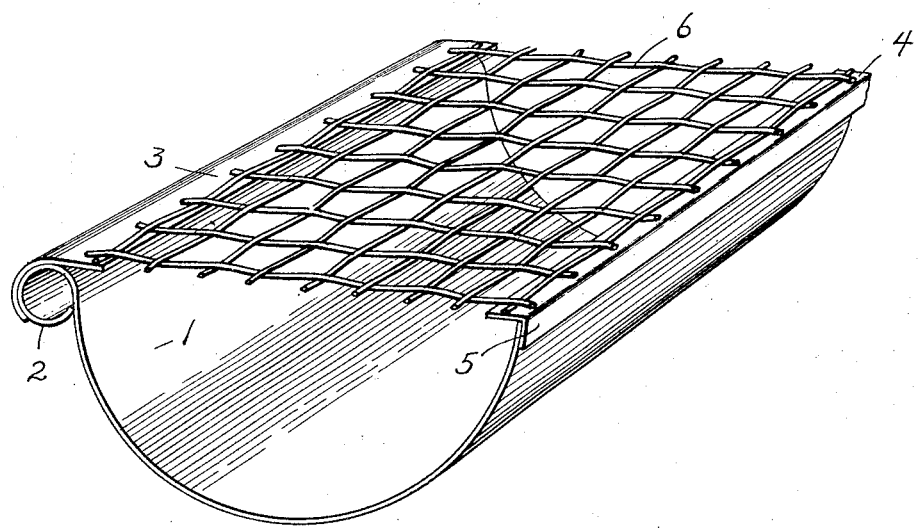
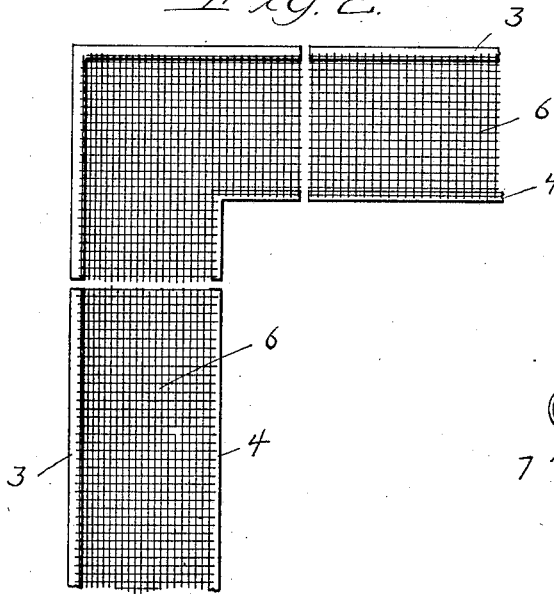
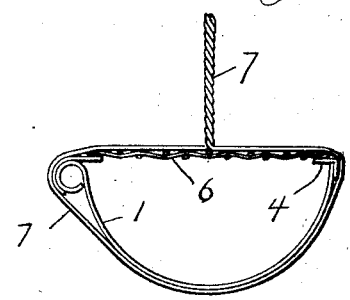
Witness:
R. L. Carrington
Inventor:
Fred W. Busse

UNITED STATES PATENT OFFICE.

FRED W. BUSSE, OF LOUISVILLE, ILLINOIS.

EAVES-TROUGH OR GUTTER COVER.

1,349,264.  Specification of Letters Patent.  Patented Aug. 10, 1920.

Application filed December 6, 1919. Serial No. 343,052.

*To all whom it may concern:*

Be it known that I, FRED W. BUSSE, citizen of the United States, residing at Louisville, in the county of Clay and State of Illinois, have invented certain new and useful Improvements in Eaves-Trough or Gutter Covers; and I do hereby declare the following to be a full, clear, and exact description of the invention, such as will enable others skilled in the art to which it appertains to make and use the same.

My invention relates to covers for eaves troughs or gutters, its general object being to provide a simple, cheap and easily attached covering which will prevent falling leaves, twigs and the like from clogging the trough or gutter, but which will still permit the ready entrance of water from the roof into such troughs or gutters. Heretofore, the gutter arrangements in common use have required frequent attention (particularly in the fall of the year) on account of the ease with which they become clogged by falling leaves or the like. This clogging is not only objectionable in that it causes the water during a rain to flow off at undesirable points, but also in that it prevents the desired supply of rain water from reaching the cistern. Likewise, even if the amount of such foreign matter is not sufficient for seriously clogging the eaves trough and the conductor pipes, the conveying of the leaves and twigs into the cistern makes the cistern water objectionable and may lead to a clogging of the pump used in connection with the cistern.

To reduce the extent of these difficulties, it has heretofore been customary to provide so called conductor strainers at the connection of the eaves trough with the downwardly leading conductor pipes. Such strainers have proven fairly effective in preventing a clogging of the vertical piping, but have also afforded a ready means for banking up the leaves within the eaves trough so as to clog the latter and effectively close the entrance to the conductor piping. Consequently, it has still been necessary to clear the leaves and the like out of the eaves troughs, which often means dangerous climbing and undue exposure to the rain.

As a more desirable solution of the problem, my invention aims to provide a simple and desirably sectional covering which can readily be attached to the entire eaves trough so as to act as a strainer for all of the rain entering the trough, thereby keeping the undesirable solid matter entirely out of these troughs while permitting the ready entry and conducting away of the water. More particularly, my invention aims to provide sectional cover portions for this purpose which will be simple and durable in construction, which can readily be adjoined in any desired lengths and attached to the troughs without the use of tools, which will firmly interlock with the troughs so as to prevent the cover portions from being lifted out of position by contact with swaying branches, and which will not interfere with the ordinary means of suspending or otherwise supporting eaves troughs. Still further objects of my invention will appear from the following specification and from the accompanying drawings, in which drawings—

Figure 1 is a perspective view of a portion of an eaves trough and a corresponding portion of my covering screen mounted on the same.

Fig. 2 is a plan view showing both a corner or miter section of my covering-screen, and parts of adjacent straight sections.

Fig. 3 is a vertical transverse section through an eaves trough equipped with the cover of my invention, showing the same as supported by a common type of suspension hanger.

While the covering of my invention is applicable to troughs or gutters of any section, I have here illustrated the same in connection with an eaves trough of the kind having one edge rolled, though I do not wish to be limited in the application of my invention to the particular form here disclosed, nor to the particular details of construction and arrangement here pictured or described. Obviously, numerous modifications might be made without departing from the spirit of my invention.

Generally speaking, I accomplish the purposes of my invention by providing cover portions, each of which consists of a central foraminous member (desirably in the form of a wire screen) and a pair of side strips. The wire screen portion desirably approximates the open mouth of the trough in width and is soldered or otherwise suitably secured to the sheet metal strips which form a mounting or edging for the wire screen and which support this screen firmly and in operative position.

Where such a covering is to be applied to a trough or gutter 1 having a rolled edge 2, I desirably provide one of the metal edge strips 3 with a correspondingly rolled flange adapted to hook over this roll edge of the trough, so as to afford an engagement which will prevent both lateral movement toward the center of the trough and vertical movement. Then I desirably provide the opposite strip 4 with a downward flange 5 engaging the other edge of the trough, so as to hold the first named curved flange 3 firmly interlocked with the roll edge 2 of the trough. In practice, both the sheet metal strips and the wire screening 6 as used for this purpose can be of a sufficiently light gage so that they will not add much to the total circumference of the trough. Consequently, the regular type of trough hangers, such as the wire hanger 7 shown in Fig. 3 can readily be used when the troughs are equipped with the screening covers of my inventions, and these hangers themselves will also aid in holding the covers in a normal position.

To provide for variations in the lengths and shapes of the eaves troughs, I desirably construct the covers of my invention in corner or miter sections corresponding to standard eaves troughs corners, and in straight sections. These straight sections can be made in any desired lengths and can readily be shortened with ordinary tinners' shears, so that the separate sections (which are shown somewhat separated in Fig. 2, so as to emphasize the sectional construction) can be adjoined to form a complete cover for the entire eaves trough arrangement. When thus in position, it will be obvious that my covering forms a strainer extending over the entire mouth of the trough equipment, and not merely over the entrance to the conductor piping. Consequently, I effectively keep the leaves, twigs or the like entirely out of the trough and likewise keep the unmelted snow out of the trough, so that this will not freeze in the latter and clog the part of the drain system. Furthermore, the metal strips which form the edges for my screening not only serve to hold the screen portion in proper position laterally of the gutter, but also add weight, so as to coöperate with the curved flange on one of these strips and with the eaves trough hangers in preventing swaying branches from moving the screen out of its normal position. However, while I have heretofore described my covers as built in standard sections and as having downwardly directed flanges at opposite sides, I do not wish to be limited to these particular details, it being obvious that the shape could readily be modified according to the shape of the trough or gutters to which the covering is to be attached, and according to the particular supporting arrangements which are used for holding the eaves troughs.

I claim as my invention:

1. An eaves trough screen including a foraminous member, side strips attached thereto, and flanges on said side strips for engaging opposite side portions of the eaves trough.

2. An eaves trough screen including a foraminous member and side strips attached thereto, one of said side strips being curved to interlock with the roll edge of the eaves trough, the other of said side strips being flanged to engage the opposite wall of the eaves trough.

3. An eaves trough screen including a substantially L-shaped foraminous member, substantially L-shaped metal side strips attached thereto, and down turned flanges provided on said side strips for engaging the walls of the eaves trough.

Signed at Louisville, Illinois, December 3rd, 1919.

FRED W. BUSSE.